April 1, 1958

G. A. FRANKS 2,828,620

PIPE TESTING DEVICE

Filed Aug. 10, 1955

George A Franks
INVENTOR.

BY Pamela O. Wyatt
ATTORNEY

April 1, 1958     G. A. FRANKS     2,828,620
PIPE TESTING DEVICE
Filed Aug. 10, 1955     2 Sheets-Sheet 2
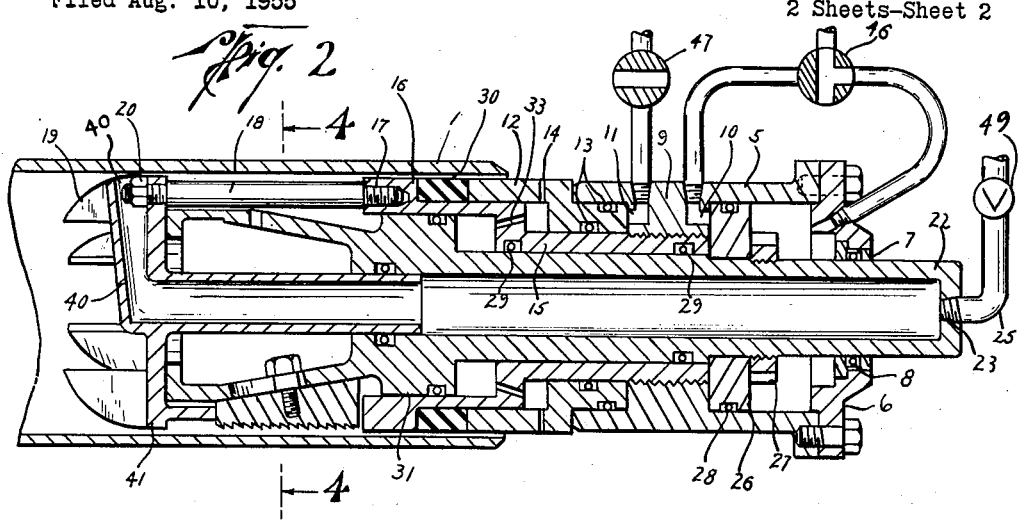
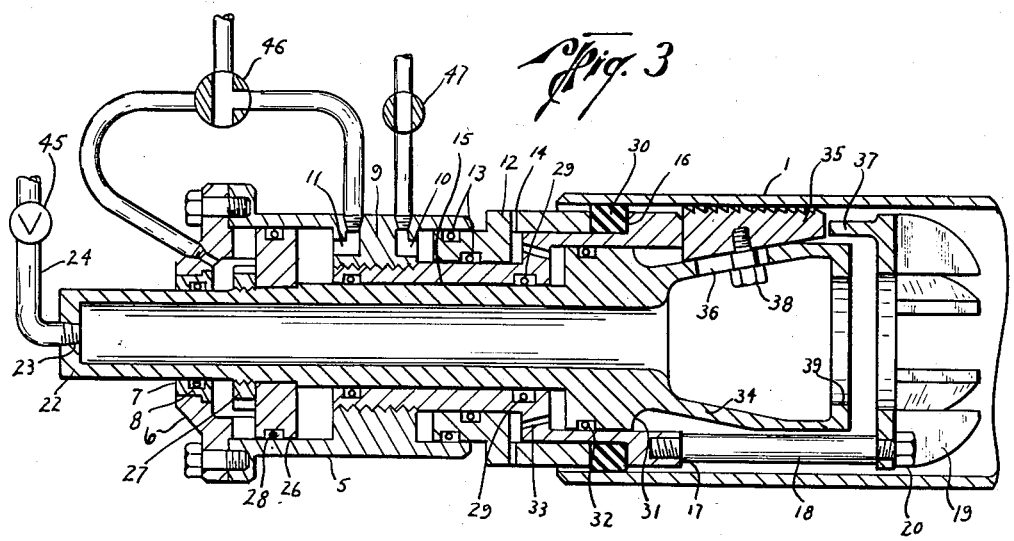
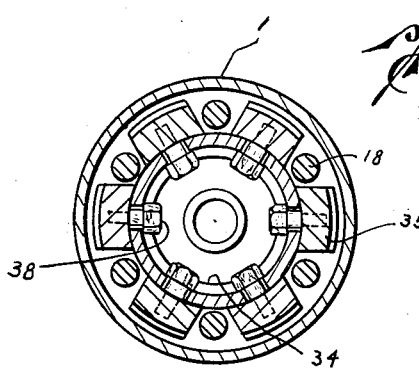
George A. Franks
INVENTOR.
BY *Panseler O. Wyatt*
ATTORNEY

United States Patent Office 2,828,620
Patented Apr. 1, 1958

2,828,620

PIPE TESTING DEVICE

George A. Franks, Houston, Tex.

Application August 10, 1955, Serial No. 527,517

1 Claim. (Cl. 73—49.6)

This invention relates to new and useful improvements in a pipe testing device.

It is an object of this invention to provide a means for testing pipe by hydraulic pressure having novel means for removing most of the air from the pipe prior to the test.

It is another object of the invention to provide a hydrostatic pipe testing device having novel means for removing air from a section of pipe to be tested, and hydraulically moving the parts into and out of testing position.

In testing sections of pipe that are recovered from a pipe line preparatory to reuse, it is desirable to perform the test where the pipe is excavated before reusing same, and it is therefore necessary to have a readily portable testing device. It is an object of this invention to provide a testing device that may be readily portable, easily loaded on a small truck, and thus transported to the place of testing, and quickly and easily assembled and placed in operation.

It is still another object of this invention to provide a device for hydrostatic testing of sections of pipe that will test a maximum length of the section of pipe, having the sealing means for each testing tool immediately adjacent the end of the section of pipe being tested.

It is still a further object of the invention to provide a device for each end of a section of pipe to be tested that will be moved into sealing position and out of sealing position by hydraulic pressure.

With the above and other objects in view, the invention has relation to certain novel features of construction, operation and arrangement of parts more particularly defined in the following specification and illustrated in the accompanying drawings, wherein:

Figure 2 is a cross sectional side elevational view showing one end of the device in released position.

Figure 3 is a cross sectional view, in side elevation, of the opposite end device, shown in sealed position, and Figure 4 is a cross sectional view taken on the line 4—4 of Figure 2.

Figure 1:
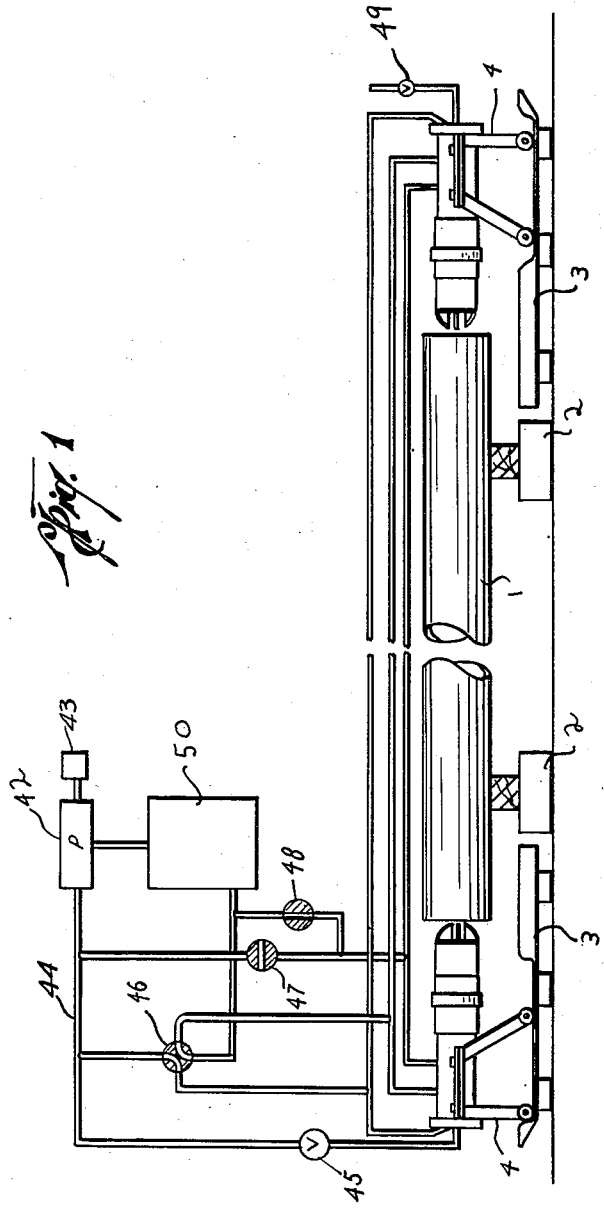
Figure 1 is a longitudinal side elevational view of the device in pipe testing position.

Referring now more particularly to the drawings, the numeral 1 designates a pipe to be tested, which may be mounted on suitable supports as 2, 2, of any desired design, and preferably equipped with rails, 3, 3, forming tracks for the trucks 4, 4.

Mounted on the trucks 4, 4 are the cylindrical housings, as 5, 5, having end plates 6, 6, through which axial ports 7, 7 are formed. Suitable sealing means, such as the gland and O-rings, as 8, 8, may be provided in the port 7. An annular integral ring 9 is formed in the housing 5 having discharge ports extending therethrough, as 10, 10, 11, 11, and the axial face of the rings 9, 9 is threaded.

Mounted in the housings 5, 5 and abutting against the rings 9, 9 are the seal ring glands 12, 12 having suitable O-ring seals 13, 13 and having a relief port, as 14.

Mounted in each ring 9 is a guide as 15 which extends beyond the gland 12 and there is enlarged forming a mandrel guide on its inner surface and enlarged externally forming a seal ring chamber on its outer surface. A seal ring of yieldable material, as 30, is mounted on each guide 15 and abuts against the shoulder 16, on the guide 15, and the extended end of the gland 12. Internally threaded sockets 17 are formed in the end face of each guide 15 and spacer bolts 18 are mounted therein. The opposite ends of the bolts 18 extend through the guide fin plates 41, which support the guide fins 19 and suitable securing means as the nuts 20 maintain the plates mounted on said bolts.

A mandrel is mounted between the plate 41 and the end of the guide 15 and has an actuating stem as 22 which extends rearwardly through the guide 12 and the port 7. A passageway 23 extends through the outer end of said stem 22 and in one of the testing devices, as shown in Figure 3, is connected to the inlet line 24, and in the other testing device, as shown in Figure 2, to the outlet line 25. A piston 26 is mounted on each stem 22 in the housing 5, and a suitable retaining means as the nut 27 may be provided and suitable sealing means as 28 may be mounted on the piston 26. Also suitable sealing means, as 29, may be employed between the guide 15 and stem 22.

The forward end of the stem 22 is enlarged forming the mandrel guide 31, which may be provided with suitable sealing means as 32 and which abuts against the enlarged portion of the guide 15. Suitable relief ports as 33 may be provided through the guide 15. The extended end of the stem 22 forms a mandrel 34 on which a plurality of slips 35 are mounted. The slips 35 are slidably maintained in place by means of the bolts 38 which extend through longitudinal slots 36. The fin plates 41 have rearwardly extending stops as 37, which limit the forward movement of the slips 35.

The inlet testing device guide stem 22 is open at its forward end as at 39 and the outlet testing member guide stem forms an upwardly extended conduit 40 which terminates at the extreme upper end of the fin plate 41.

Suitable pressure pumps as 42, 43 may be provided. Pressure lines 44 lead from the pumps and pressure flow is controlled by the valves 45, 46, 47 and 48.

When it is desired to test a section of pipe, the pipe is mounted on suitable supports as 2, 2 and the trucks 4, 4 are moved towards the ends of the pipe on the tracks as 3, 3, moving the respective members into the ends of the pipe to be tested until the rings 30 are positioned immediately adjacent the ends of the pipe and inside the pipe. The valves 47 are then moved to the position necessary to apply pressure to the gland 12, moving same against the rings 30 and expanding same until securely set in the pipe and the valve 47 then closed. The valves 46 are then moved to the position necessary for applying pressure to the piston 26 to move the stem 22 rearwardly, setting the slips 35. The valve 45 is then opened permitting fluid under pressure to enter the pipe to be tested, and the valve 49 is opened permitting air in the pipe to escape through the vent pipe 25. The terminus of the conduit 40 will be adjacent the top of the pipe being tested so that the pipe to be tested may be filled with water and all of the air escape so that the proper hydrostatic pressure may be quickly reached to effect a test. When the air has escaped and the water level reaches the terminus of the conduit 40 the valve 49 is closed and the hydrostatic pressure is built up in the pipe to be tested. When the test has been completed, the valves 45 and 47 are closed and the valve 48 is opened, permitting the fluid in the line to return to the water storage tank 50 and removing the pressure on the ring 30, and the valve 46 is then moved to the position necessary to apply pressure to the back of the piston 26 such as is shown in Figure 2, moving the piston 26 forwardly and moving the mandrel 34 forwardly, releasing the slips 35, withdrawing them from their gripping relation with the pipe, and permitting the ready withdrawal of the members from the pipe.

While the foregoing is considered a preferred form of the invention, it is by way of illustration only, while the broad principle of the invention will be defined by the appended claim.

What I claim is:

In a device for hydrostatic testing of sections of pipe, a pair of testing members, one of said members being an inlet member and the other of said members being an outlet member, a piston housing on each of said members, said housing having an internally enlarged portion forming an annular ring, a mandrel guide stem guide having one end mounted in said annular ring and the other end being enlarged forming a mandrel guide chamber, and being externally enlarged forming a sealing ring retainer, a seal ring mounted thereon, a slidable gland mounted on said guide and extending at one end into said housing, the other end abutting against said seal ring, means moving said gland against said sealing ring and expanding same within the pipe to be tested against the inside wall of the pipe adjacent the respective ends thereof, a mandrel guide stem and a mandrel, slips mounted on said mandrel and movable into and out of contact with the pipe to be tested by application of hydraulic pressure to the respective sides of said piston.

References Cited in the file of this patent
UNITED STATES PATENTS

| | | |
|---|---|---|
| 2,475,748 | Leroy | July 12, 1949 |
| 2,507,124 | Stillinger | May 9, 1950 |
| 2,607,370 | Anderson | Aug. 19, 1952 |
| 2,610,651 | Hahn | Sept. 16, 1952 |
| 2,652,717 | Bush et al. | Sept. 22, 1953 |
| 2,711,795 | Ragan | June 28, 1955 |
| 2,735,497 | Brumleu et al. | Feb. 21, 1956 |